United States Patent [19]
Tang et al.

[11] 4,041,990
[45] Aug. 16, 1977

[54] ACCUMULATOR FOR USE IN A HYDRAULIC SYSTEM

[75] Inventors: Louis S. Tang, Windsor, Canada; Dean E. Runkle, La Porte; Lloyd G. Bach, South Bend, both of Ind.

[73] Assignee: The Bendix Corporation, South Bend, Ind.

[21] Appl. No.: 673,831

[22] Filed: Apr. 5, 1976

[51] Int. Cl.$^2$ .............................. F16L 53/00
[52] U.S. Cl. ........................ 138/31; 60/405; 60/413; 277/2; 277/DIG. 10
[58] Field of Search ............... 60/405, 413, 534, 535; 137/68, 554, 797; 138/30, 31; 277/2, DIG. 10

[56] References Cited
U.S. PATENT DOCUMENTS

| 2,546,055 | 3/1951 | Ballard | 138/131 |
| 2,986,158 | 5/1961 | Gratzmuller | 138/31 |

*Primary Examiner*—Richard E. Aegerter
*Assistant Examiner*—Frederick R. Schmidt
*Attorney, Agent, or Firm*—Leo H. McCormick, Jr.; Ken C. Decker

[57] ABSTRACT

An accumulator for use in a brake booster having a housing with a piston located in a bore. The piston has a plug attached thereto. The piston moves in response to a predetermined thermal expansion of a fluid in the accumulator. A predetermined movement shears the plug from the piston to prevent damage to the housing by venting the bore to a reservoir.

10 Claims, 2 Drawing Figures

ACCUMULATOR FOR USE IN A HYDRAULIC SYSTEM

BACKGROUND OF THE INVENTION

Accumulators are standard components in hydraulic systems wherein a hydraulic demand momentarily exceeds a pump capacity. The fluid volume in the accumulator is replenished by the pump when the pump capacity exceeds the demands of the hydraulic system.

U.S. Pat. No. 3,004,561 illustrates a typical accumulator wherein a piston separates a container into a hydraulic chamber and a gas chamber. During periods of replenishment, hydraulic fluid acts on the piston to compress the gas by reducing the volume in the gas chamber. During periods of peak demand, the hydraulic fluid is discharged from the accumulator as the gas expands and reduces the size of the hydraulic chamber. Since the piston is in continual modulation, a seal is required to prevent leakage of the hydraulic fluid into the gas chamber. Unfortunately, after a period of time, hydraulic fluid may leak past the seals and completely fill the gas chamber to thereby eliminate the effectiveness of the accumulator. For practical purposes hydraulic fluid is not compressible. However, the hydraulic fluid reponds to thermal energy by expanding to develop high internal pressure in the gas chamber. Under some conditions this high internal pressure as ruptured the housing of the accumulator.

SUMMARY OF THE INVENTION

We have devised an accumulator for use with a brake booster including means to prevent damage to the housing resulting from thermal expansion of the hydraulic fluid. The accumulator housing has a bore with a piston located therein. The piston has a plug attached to the end thereof. The piston separates the bore into a boost chamber and a hydraulic chamber. The piston is modulated by actuation of a valve means. The actuated valve means opens the hydraulic chamber and allows a compressed fluid to expand. The expansion of the compressed fluid communicates hydraulic fluid into the brake booster. A seal attenuates the communication of hydraulic fluid into the boost chamber from the hydraulic chamber. After repetitive modulations, it is possible for the boost chamber to be completely filled with hydraulic fluid. Whenever a thermal condition causes the hydraulic fluid in the accumulator to expand, the valve means allows hydraulic fluid to escape from the hydraulic chamber. When hydraulic fluid escapes from the hydraulic chamber, the piston moves toward the brake booster housing. When the piston approaches the brake booster housing, the plug engages the brake booster housing. Thereafter with additional thermal energy pressure build up, the plug is sheared off the piston to allow free communication between the boost chamber and the hydraulic chamber. With the plug sheared, the hydraulic fluid in the accumulator is vented into the brake booster. During the shearing of the plug, an over center position switch is activated to inform the vehicle operator of a total accumulator failure.

It is the object of this invention to provide an accumulator with a piston having a shearable plug attached thereto. The piston moves in response to pressure developed by thermal energy and shears the plug from the piston to vent the accumulator to atmosphere and dissipate the thermal energy generated pressure.

It is a further object of this invention to provide an accumulator with a piston having a shearable plug means to prevent damaging the accumulator upon movement of the piston in response to thermal energy.

It is another object of this invention to provide an accumulator with switch means for indicating excessive movement of a piston means and for indicating rupture of the piston means in reponse to thermal energy.

It is a still further object of this invention to provide a brake booster with an accumulator having a gas charged piston whose abnormal movement activates an indicator in inform an operator of the possibility of accumulator failure.

These and other objects will become apparent from reading this specification and viewing the drawing.

DETAILED DESCRIPTION OF THE PREFERRED EMBODIMENT

Figure 1:
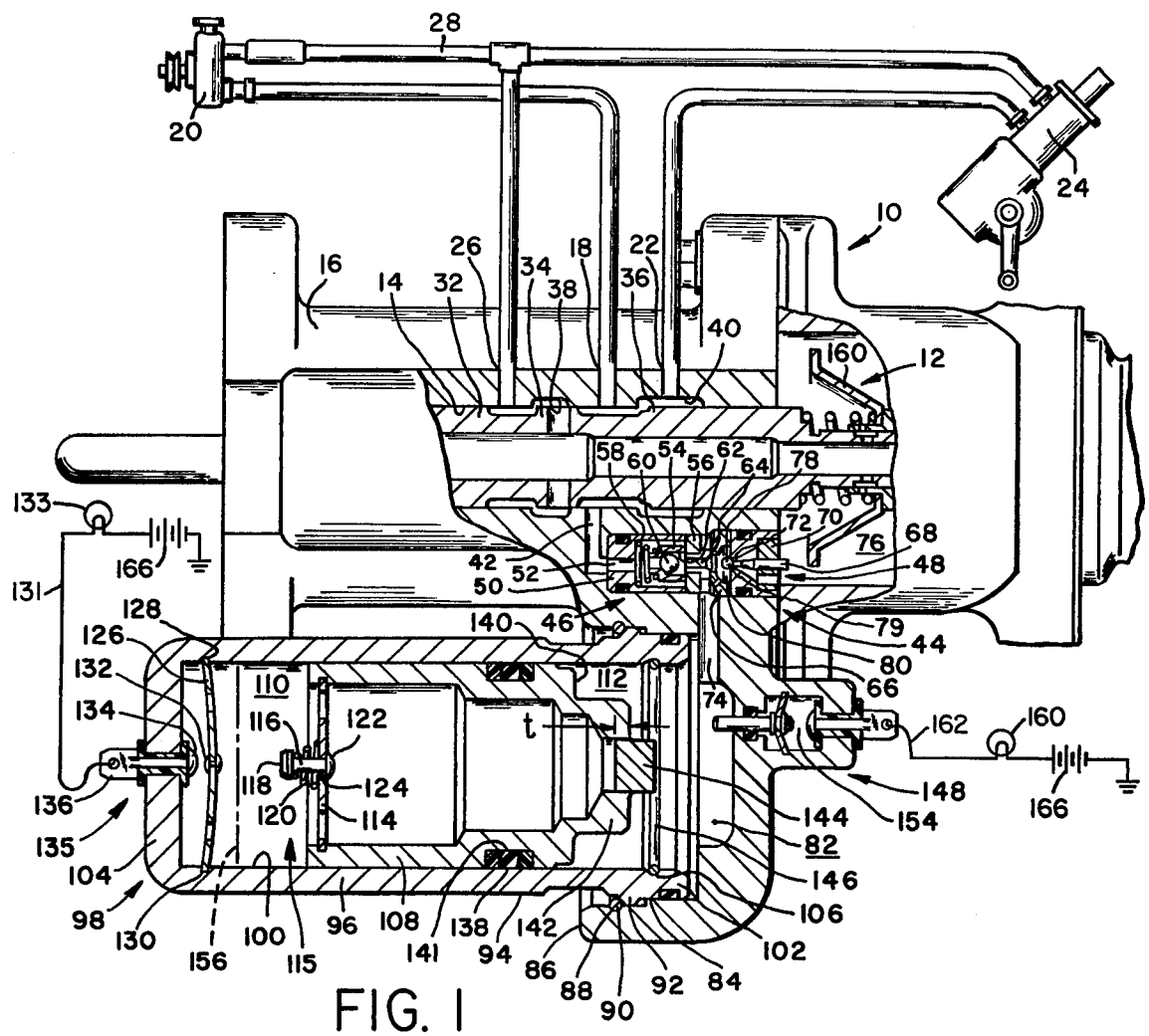
FIG. 1 is a schematic illustration of power steering and brake booster including a sectional view of a gas charged accumulator made according to the teachings of our invention.

The hydraulic brake booster 10, shown in FIG. 1, has a spool valve means 12 actuated by an input signal from an operator in a manner completely described in U.S. Pat. No. 3,751,912. The spool valve means 12 is located in bore 14 of the booster housing 16. The bore 14 has an inlet port 18 connected to the high pressure side of a vehicle's power steering pump 20, an outlet port 22 connected to the power steering gear 24, and a relief port 26 connected through conduit 28 to the reservoir in the pump 20. The cylindrical body 30 of the spool valve means 12 has a series of lands 32, 34 and 36 associated with first and second grooves 38, 40 in housing 16 for controlling the flow of the hydraulic fluid from the pump 20 through the booster 10.

The inlet port 18 is connected to a passage 42 which communicates hydraulic fluid into valve means 44.

The valve means 44 has a fill valve 46 and an actuation valve 48. The fill valve 46 has a cylindrical body 50 with a stepped axial bore 52. A sleeve 54 located in the stepped axial bore 52 is held against a stop 56 by resilient means 58. A ball 60 is loosely located in passage 62 of the sleeve 54. A projection 64 extends from spacer 66 to limit the movement of the ball 60 is passage 62.

The actuation valve 48 has a stem 68 retained in a bearing member 70. The bearing member has a passage 72 which connects passage 74 with hydraulic chamber 76 in the brake booster 10. The stem 68 has a ball 78 which is located in a cavity 80 in the spacer 66. Passage 74 connects hydraulic chamber 76 to cavity 82 in the housing 16.

The housing 16 has a stepped bore 84 which extends from edge 86 to the cavity 82. An annular groove 88 is located in the stepped bore 84 adjacent edge 86.

A keeper or snap ring 90 located in groove 88 engages rib 92 on the periphery 94 of the housing 96 to secure the accumulator means 98 to the housing 16 of the brake booster 10.

The housing 96 of the accumulator means 98 has an axial bore 100 which extends from a first end 102 toward a second end 104. An annular groove 106 is located in the housing 96 adjacent the first end 102.

A piston means 108 has a cylindrical body with a diameter substantially equal to the diameter of the axial bore 100. The piston means 108 separates the axial bore 100 into a boost chamber 110 and a hydraulic chamber 112. A bracket 114 is attached to the end of the piston means 108 in the boost chamber 110. The bracket 114 has an axial opening 124. An actuator 115 attached to bracket 114 has stem 116 located in the axial opening 124. A spring 120 located between the head 118 on the stem 116 and the bracket 114 holds base 122 of the actuator 115 against the bracket 114.

A flat spring 126 is located in slots 128 and 130 in the boost chamber 110 adjacent the second end 104. The flat spring 126 has a first electrical contact 132 located in line with head 118 of the actuator 115 on piston means 108.

A second electrical contact 134 located in the second end 104 of housing 96 has a spade 136 connected to an electrical circuit 131 containing an indicator means, for illustrative purposes shown as light 133. First and second contacts 132 and 134 form a first switch means 135 which permits electrical energy from battery 166 to operate the light 133.

A seal 138 located in groove 141 in the piston means 108 attenuates communication between the boost chamber 110 and the hydraulic chamber 112.

The piston means 108 has a face 140 with an annular ledge 142 projecting therefrom into the hydraulic chamber 112. A plug 144 is attached on the annular ledge 142. In some instances the plug 144 is an integral part of the piston means 108 with the thickness "t" controlling the strength of the plug connection while at other times it may be desirable to weld the plug 144 to the annular ledge 142. The strength of the plug connection limits the thermal pressure build up in the accumulator housing to a predetermined value.

A retainer 146 located in groove 106 limits the movement of the piston means 108 in the hydraulic chamber 112.

A second switch means 148 located in housing 16 has a stem 149 which extends into the cavity 82. The stem 149 is biased away from contact 150 by a belleville washer 152 in order to create gap 154. The contact 150 is connected to the indicator means, for illustrative purposes shown as light 160, by circuit 162. When contact 150 engages contact 156 on stem 149 completes an electrical circuit is completed. Completion of the electric circuit allows electrical energy from battery 166 to energize light and inform the operator of a complete failure of the accumulator 98.

METHOD OF ASSEMBLING THE ACCUMULATOR

The accumulator housing 96 is placed in a high pressure chamber containing a compressible fluid. The piston means 108 is inserted in bore 100 and retainer 146 positioned in groove 106. The accumulator 98 is now removed from the high pressure chamber. By assembling the accumulator 98 in the high pressure chamber, the comressible fluid in the boost chamber 110 is charged to a high pressure thereby eliminating the need for a boost port in the housing 96. When the accumulator means 98 is removed from the high pressure chamber, the high pressure in the boost chamber 110 moves the piston means 108 into contact with retainer 146.

The accumulator 98 is placed in bore 84 and a slight force applied to end 104 since plug 144 engages the bottom of cavity 82 before rib 92 engages shoulder 154.

Thereafter keeper 90 is inserted in groove 88 to secure the accumulator 98 to the booster 10.

MODE OF OPERATION OF THE PREFERRED EMBODIMENT

When the pump 20 in the vehicle is in operation, high pressure hydraulic fluid is communicated through entrance port 18 past land 36 and out the outlet port 22 for distribution to the power steering gear 24. At the same time, high pressure hydraulic fluid is communicated through passages 42 and 52 to the fill valve 46. Since ball 60 is loosely located in passage 62, hydraulic fluid flows in passage 62 for distribution through passage 74 to cavity 82. As the hydraulic fluid under pressure enters cavity 82, piston means 108 moves toward the second end 104 by compressing the compressible fluid in the boost chamber 110. The accumulator 98 is designed, such that when the boost chamber 110 is properly filled with a compressible fluid, the maxium distance the hydraulic fluid under pressure can move piston 108 is line 156. When piston 108 approaches line 156, flow of the high pressure fluid through passage 62 is proportionally reduced. Thereafter, any drop in the pressure of the hydraulic fluid in passage 42 creates a pressure differential which seats ball 60 on sleeve 54.

If the pressure in the hydraulic chamber 112 is increased due to the effect of thermal expansion, spring 58 is overcome and sleeve 54 moves away from stop 56 to allow hydraulic fluid to escape into passage 52 by flowing around the outside of the sleeve 54. When the hydraulic fluid pressure in the hydraulic chamber 112 and cavity 82 is sufficiently reduced, spring 58 again seats sleeve 54 on stop 56 to interrupt communication from passage 74 into passage 52.

As completely described in U.S. Pat. No. 3,751,912 which is incorporated herein by reference, upon actuation of the booster 10, spool valve means 12 moves to divert a portion of the flow of hydraulic fluid from the inlet port 18 into groove 38 for distribution into hydraulic chamber 76. The hydraulic fluid in chamber 76 provides an operational force for energizing a master cylinder (not shown).

If the actuation force from the operator exceeds the hydraulic force available from the pump 20, actuator 160 engages stem 68 and moves ball 78 away from seat 79 to activate the accumulator means 98. With ball 78 away from seat 79, the compressed fluid in boost chamber 110 forces the hydraulic fluid in chamber 112 through passage 72 into the hydraulic chamber 76 to meet this operational demand.

With a termination of the actuation input from the operator, the spool valve means 12 returns to the position shown in FIG. 1. Thereafter, the high pressure hydraulic fluid communicated to the inlet port 18 flows through fill valve 46 and recharges the accumulator 98.

After a period of time, excessive modulation of piston 108 can permit a portion of the compressible fluid in chamber 110 to seep past seal 138. Thereafter, the hydraulic fluid under pressure in the hydraulic chamber 112 moves the piston 108 closer to the second end 104.

With a predetermined loss of the compressible fluid, the hydraulic fluid under pressure in the hydraulic chamber 112 moves the piston 108 such that head 118 engages and moves spring 126 past center. When spring 126 moves past center, contact 132 is snapped into engagement with contact 134 to activate the first switch means 135 and permit electrical energy from battery 166 to operate light 133 to provide an indication signal indicative of the position of the piston 108 in bore 100. With the piston 108 adjacent end 104, the compressible fluid in the boost chamber 110 offers little or no motive force for moving the hydraulic fluid out of the hydraulic chamber 112 upon actuation of valve 48.

When seal 138 has deteriorated to this extent, quite often hydraulic fluid eventually replaces all of the compressible fluid in the boost chamber 110 rendering the accumulator 98 useless.

With hydraulic fluid present in both the boost chamber 110 and the hydraulic chamber 112, expansion of the hydraulic fluid from thermal energy must be relieved to prevent damage to the housing 96. The expansion of the hydraulic fluid in the hydraulic chamber 112 is relieved by movement of sleeve 54 in opposition to spring 58. As the pressure in hydraulic chamber 112 is relieved, a pressure differential is created across piston 108. This pressure differential eventually moves plug 144 on the end of piston 108 against boost housing 16.

Figure 2:
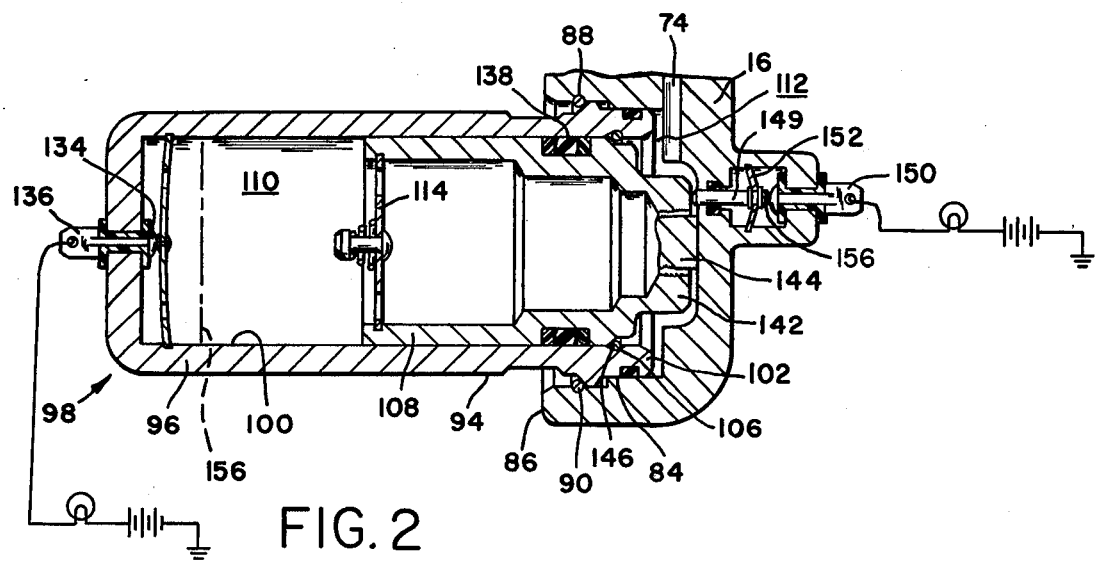
FIG. 2 is a sectional view of the accumulator of FIG. 1 showing a safety plug sheared from the boost piston.

When the hydraulic pressure in the boost chamber 110 reaches a predetermined value, a force acts on the piston 108 to shear plug 144 from the piston 108, as shown in FIG. 2. With plug 144 separated from piston 108, the hydraulic fluid pressure in the boost chamber 110 is also relieved by movement of sleeve 54 of the fill valve 46.

When plug 144 engages the housing 16, stem 149 engages the annular projection 142. During the shearing of the plug 144, stem 149 moves the belleville washer 152 past center to bring contacts 156 and 150 into engagement. Engagement of contacts 256 and 150 activates the second switch means 148 and to permit electrical energy to activate light 160 and inform the operator of a complete failure of the accumulator 98.

We claim:

1. An accumulator for use in a hydraulic system comprising:
   a housing having a bore therein;
   piston means located in said bore for establishing a boost chamber and a hydraulic chamber, said boost chamber retaining a fixed volume of a compressible fluid, said hydraulic chamber being connected to a source of hydraulic fluid under pressure in said hydraulic system, said compressible fluid escaping from said boost chamber and replaced with hydraulic fluid from the hydraulic chamber after a period of time, said hydraulic fluid in said boost chamber being responsive to thermal energy to create a thermal hydraulic pressure, said thermal hydraulic pressure moving said piston means toward said hydraulic chamber; and
   plug means attached to said piston means, said plug means being sheared from said piston means upon engagement with said housing through a predetermined movement of said piston means in said hydraulic chamber by said thermal hydraulic pressure to establish a flow path between said boost chamber and said hydraulic chamber to allow the hydraulic fluid in said boost chamber to be freely communicated to the hydraulic chamber and to thereby dissipate said thermal hydraulic pressure therein without damage to said housing.

2. In the accumulator, as recited in claim 1, further including:
   switch means located in said boost chamber and responsive to a predetermined amount of movement of said piston means in said bore for activating an indicator to inform an operator of a position of said piston means within said bore.

3. In the accumulator, as recited in claim 2, wherein said housing includes:
   first retainer means located in a groove in said bore for limiting the movement of said piston means within said bore.

4. In the accumulator, as recited in claim 3, wherein said housing further includes:
   rib means located on the periphery of said housing, said rib means engaging a shoulder on a boost device in said hydraulic system;
   keeper means attached to the boost device and engaging said rib means for holding the accumulator in said hydraulic system.

5. In the accumulator as recited in claim 1, further including:
   resilient means located in said boost chamber having a first contact located thereon; and
   connector means secured to said housing having a second contact located in said boost chamber, said second contact being connected to an indicator means, said resilient means moving in response to movement of said piston means toward said boost chamber for bringing first contact into engagement with said second contact to complete an electrical circuit and permit an operation signal to activate said indicator means to inform an operator of the operating condition of the accumulator.

6. An accumulator for a hydraulically operated brake booster comprising:
   a first housing having a first end and a second end, said first housing having a bore extending from said first end toward said second end, said first housing having an annular groove adjacent said first end, said first housing having a rib on the peripheral surface adjacent the first end, said first end being located in a cavity in a second housing of said brake booster, said cavity being connected to a source of hydraulic fluid under pressure;
   first retainer means connected to said rib for holding the first housing in said cavity;
   piston means located in said bore for establishing a boost chamber in said bore adjacent said second end, said boost chamber being adapted to retain a fixed volume of compressible fluid;
   seal means located in said piston means for attenuating the communication of said compressible fluid between said boost chamber and said cavity;
   keeper means located in said annular groove for retaining said piston means in said bore;
   valve means responsive to an operational signal in said brake booster for controlling the communication of hydraulic fluid into said cavity, said hydraulic fluid in said cavity modulating said piston means as a function of the compressible fluid in the boost chamber, said compressible fluid after repeated modulations escaping into the cavity and replaced by hydraulic fluid, said valve means maintaining the hydraulic fluid in the cavity below a predetermined value, said hydraulic fluid in said boost chamber expanding in response to receiving thermal energy to move said piston means toward said cavity; and
   plug means secured to said piston means and engaging the second housing of said brake booster when said piston approaches said first end, said hydraulic fluid in the boost chamber acting on the piston means to shear the plug means from the piston means to establish a flow path through the piston means to allow the hydraulic fluid in the boost chamber to escape into the hydraulic booster without damaging said first housing.

7. In the accumulator, as recited in claim 6, further including:
switch means connected to said boost chamber and responsive to movement of said piston means for completing an electrical circuit to activate an indicator which informs an operator of the absence of said compressible fluid in said boost chamber.

8. In an accumulator for a hydraulic system:
a housing defining a bore therewithin;
a piston slidably mounted in said bore and cooperating with the latter to define a pair of chambers between opposite ends of the piston and corresponding ends of the bore;
means for communicating hydraulic fluid into one of said chambers; and
energy storage means in the other chamber acting on said piston to pressurize the hydraulic fluid in said one chamber;
said piston carrying frangible means responsive to movement of the piston in response to an overpressure condition in one of said chamber, said frangible means engaging said housing and rupturing to establish a flow path between said pair of chambers to communicate said chambers with each other and equalize the hydraulic fluid pressure therebetween to prevent damage to said housing during an overpressure condition in one of said chambers.

9. The invention of claim 8, wherein said frangible means is a plug carried by the piston and separated therefrom through engagement with the housing upon overtravel of said piston due to an overpressure condition in said other chamber.

10. The invention of claim 9, wherein said plug projects from the face of said piston defining said one chamber and is separated from the piston when the plug is driven into engagement with the end of the housing defining said one chamber by a predetermined force caused by the overpressure condition in said other chamber.

* * * * *